UNITED STATES PATENT OFFICE.

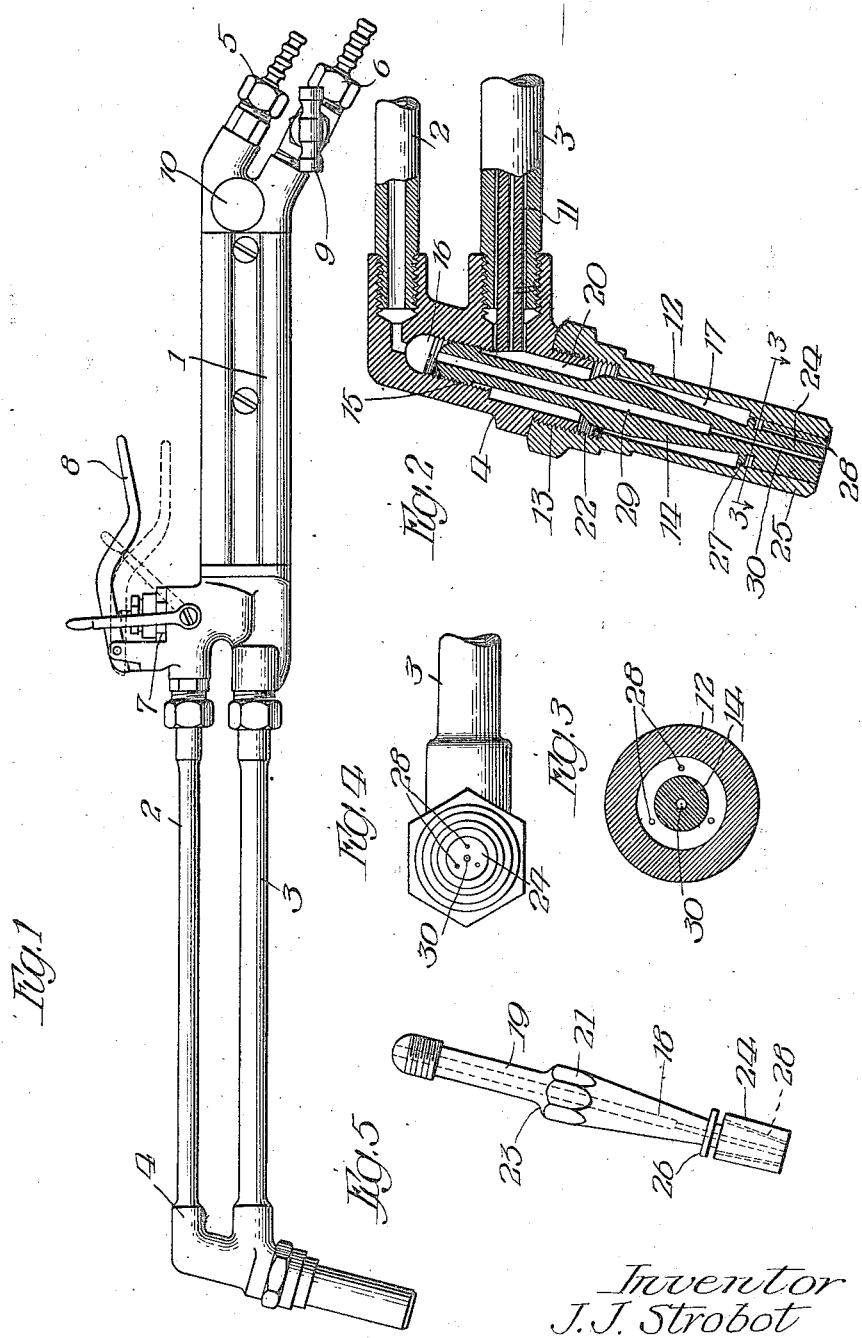

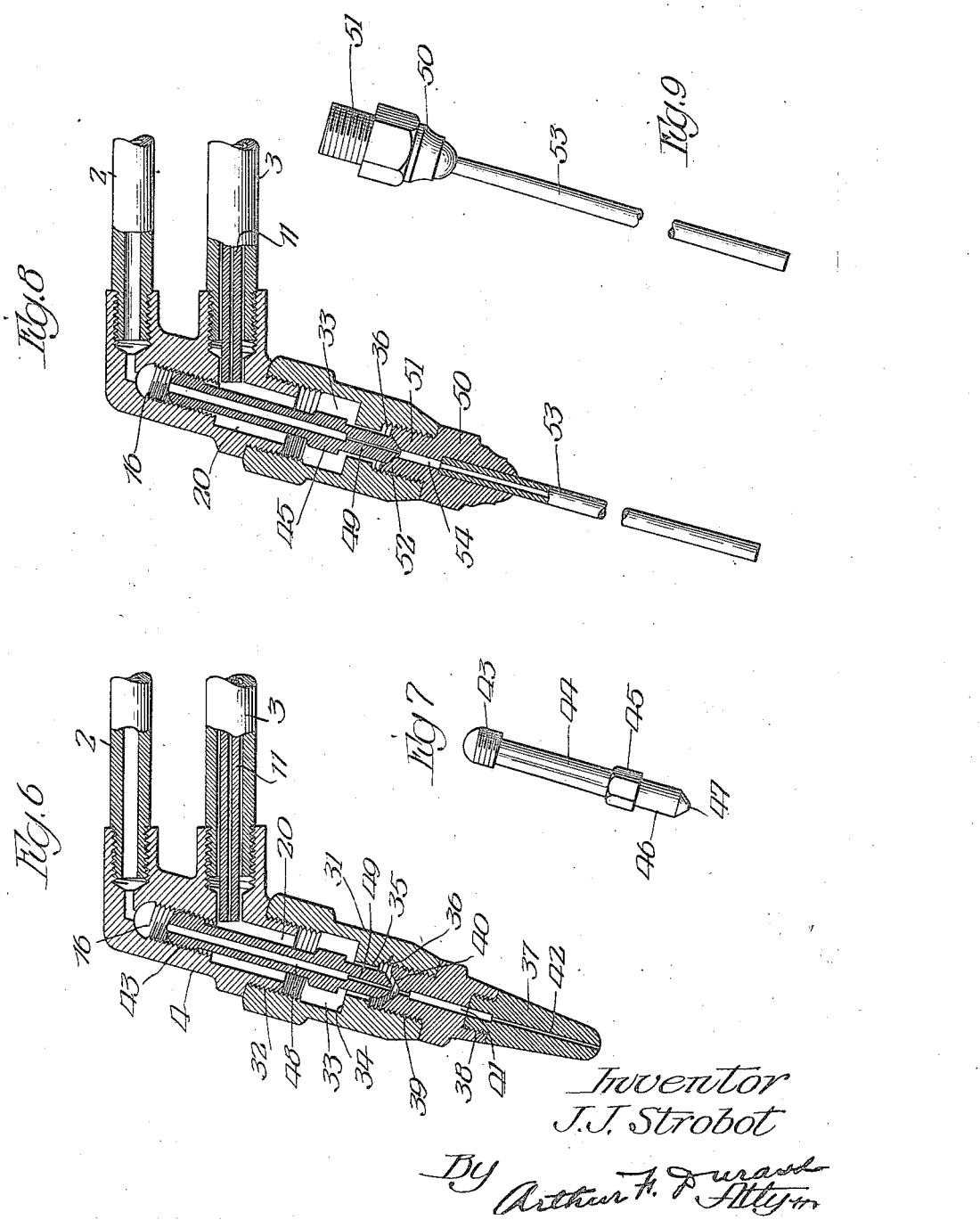

JOHN J. STROBOT, OF CHICAGO, ILLINOIS, ASSIGNOR TO FIDELITY BRASS MANUFACTURING COMPANY, OF CHICAGO, ILLINOIS, A CORPORATION OF ILLINOIS.

ACETYLENE TORCH.

1,424,189.  Specification of Letters Patent.  Patented Aug. 1, 1922.

Application filed April 9, 1919. Serial No. 288,727.

*To all whom it may concern:*

Be it known that I, JOHN J. STROBOT, a citizen of the United States of America, and a resident of Chicago, Illinois, have invented a certain new and useful Improvement in Acetylene Torches, of which the following is a specification.

This invention relates to acetylene torches in general, but more particularly to those which are employed for cutting and welding metal, and for similar purposes.

Generally stated, the object of the invention is to provide an improved construction and arrangement whereby a cutting torch may be converted into a welding torch by means of nozzles which are adapted to be used interchangeably on one and the same torch body, so that the torch can be used for either purpose by simply substituting one nozzle for the other.

It is also an object to provide means whereby the welding torch may be readily converted into a torch for burning the carbon out of an internal combustion engine, by substituting a special nozzle for the nozzle which is employed for welding purposes.

It is also an object to provide certain details and features of construction and combinations tending to increase the general efficiency and the desirability of an acetylene torch of this particular construction.

To these and other useful ends the invention consists in matters hereinafter set forth and claimed.

In the accompanying drawings—

Fig. 1 is a side elevation of a cutting torch to which the invention is applicable.

Fig. 2 is an enlarged vertical section of the head and nozzle portion of the torch.

Fig. 3 is an enlarged section on line 3—3 in Fig. 2.

Fig. 4 is an enlarged face view of the lower end or discharge surface of the nozzle.

Fig. 5 is a side elevation of the tip or inner nozzle of the structure shown in Fig. 2.

Fig. 6 is a view similar to Fig. 2, but showing the substitute nozzle construction which is employed to convert the torch into a welding torch.

Fig. 7 is a side elevation of the tip or inner nozzle shown in Fig. 6.

Fig. 8 is a view similar to Fig 6, but showing the construction employed when the torch is to be used in cutting out carbon from an internal combustion engine.

Fig. 9 is a side elevation of the special nozzle employed, as shown in Fig. 8, when the torch is used for eliminating carbon from the cylinder of an internal combustion engine.

As shown in Figs. 1 to 5 inclusive, the torch comprises a body 1 suitably connected with the tubes 2 and 3, as shown in my prior Patent No. 1,281,871, issued October 15, 1918, said tubes having a head 4 secured to their outer ends. The other end of the body has a fitting 5 to be connected with the supply of oxygen, and a fitting 6 for connection with the supply of acetylene, passages leading through the body 1 to the tube 2 for the oxygen, and to the tube 3 for the acetylene. A valve 7, of any suitable character, operated by a lever 8, controls the supply of oxygen to the tube 2, and a valve 9 in the fitting 6 controls the supply of acetylene to the tube 3, in a manner that will be readily understood. A third valve 10 is provided to control a passage for excess oxygen from the fitting 5 to a smaller tube 11 (see Fig. 2) within the tube 3, whereby the extra supply of oxygen is available for cutting purposes. The nozzle construction involves an outer nozzle 12 which is screw-connected at 13 to the lower portion of the head 4, and a tip or inner nozzle 14 which is screw-connected at 15 to the interior chamber 16 of said head. The outer nozzle has a bore 17 which encloses the tapered portion 18 of the inner nozzle, the latter having a reduced cylindrical portion 19 which occupies the bore 20 in the head, it being observed that the middle portion 21 of the inner nozzle is octagonal to provide means for adjusting this nozzle by a wrench, in order to raise and lower it in the chamber 16, and whereby clearance is provided between the sides of this portion and the inner surface of the bore 17 for the passage of the acetylene downwardly within the nozzle. A chamber 22 is formed within the threaded upper portion of the nozzle 12 around the shoulder 23 formed at the top of the portion 21, and the lower portion 24 of the inner nozzle is slightly tapered to fit tightly in the lower end of the tapered bore 25 of the outer nozzle. A flange 26 is formed at the lower end of the tapered portion 18, and spaced a distance from the upper end of the portion 24, there being a slight space 27 left between the edge of this flange and the upper end of the bore 25 of the outer nozzle. Converging passages 28 are formed in the portion 24, the point to which these passages converge being some distance below the lower end of the nozzle. The inner nozzle also has a relatively large longitudinal bore portion 29 and a relatively small longitudinal bore portion 30 in the lower end portion thereof, so that the oxygen which is discharged from this longitudinal bore within the inner nozzle meets the acetylene which is discharged from the passages 28 at the point some distance below the nozzle. When the valve 10 is opened, excess oxygen is supplied through the tube 11, which mixes with the acetylene, and whereby the effect necessary for cutting metal is obtained.

For welding purposes, it is necessary, for well known reasons, that the acetylene and the oxygen be thoroughly mixed before being discharged from the nozzle of the torch. For this purpose, therefore, the construction shown in Figs. 6 and 7 is employed, it being understood that to obtain this construction the nozzles 12 and 14 are unscrewed from the head 4, leaving the latter free for connection to the special nozzle arrangement which is employed for welding purposes. This special nozzle construction comprises a body portion 31, which has its upper end screw connected at 32 with the head 4, just as the upper end of the nozzle 12 was previously connected thereto. This body portion 31 has a chamber 33 formed therein below the lower end of the bore 20 in the head, and at the lower end of this bore 33 a shoulder 34 is formed, having a restricted bore 35 at the center thereof, leading to the lower threaded bore portion 36 in the lower end of the body of the nozzle, the threaded bore portion 36 being of somewhat greater diameter than the bore 35, as shown in the drawings. The tip portion 37 of the nozzle is preferably made in upper and lower sections and screw-connected together at 38, and the upper section has a reduced threaded portion 39 screwed into the lower portion of the bore 36, this portion 39 having a beveled or dished recess 40 in the upper end thereof. A bore 41 extends downwardly through the upper section of the tip, and connects with a smaller bore 42 through which the mixture of oxygen and acetylene is discharged into the atmosphere. It will be seen that this bore 42, and also the upper end portion of the bore 41 in the upper section of the tip, are practically of the same diameter as the bore 49, but preferably a little larger. Thus the large portion in the bore 41 forms a sort of expanding and mixing chamber into which the oxygen and acetylene are driven through the restricted upper end portion of this bore. The tip or inner nozzle comprises an upper portion 43 which is screwed into the threaded bore 16 formed in the head, and which has a reduced cylindrical portion 44 enclosed in the bore 20 of the head. This tip or inner nozzle also has a hexagonal portion 45 at the lower end of the portion 44, which occupies the chamber 33, the latter being considerably greater in diameter than this portion 45, so that ample clearance and space are provided around this hexagonal portion of the tip or inner nozzle. The latter also has a lower end portion 46 provided with a beveled lower end portion 47, the latter being disposed immediately above the recess 40, and the diameter of the portion 46 being slightly less than the diameter of the bore 35, whereby the acetylene passes from the tube 3 into the bore 20 and then downwardly into the mixing chamber or spaced formed around the lower end 47 of the tip or inner nozzle. The latter is also provided with a bore 48 which terminates in a smaller bore 49 that terminates at the tip or apex of the portion 47, so that the oxygen passes downwardly through the tip or inner nozzle and mixes with the acetylene before the mixture enters the bore 41 of the nozzle, and whereby the proper mixture is formed before the discharge takes place from the nozzle of the torch, it being observed that a space or chamber is formed within the bore 36 at the upper end thereof, around the lower end of the tip or inner nozzle, to receive the acetylene from the bore 35, whereby the desired mixing action is ensured.

Thus a welding nozzle is provided which is adapted to be used interchangeably with a cutting nozzle on one and the same torch.

In Fig. 8 the construction is substantially the same as that shown in Fig. 6, but the tip 37 is omitted, and in its place a tip 50 is provided which has a reduced portion 51 that is screwed upwardly into the threaded socket 36, and which is provided with a beveled seat 52 at its upper end to engage the conical lower end portion 47 of the inner tip or nozzle. The tip 50 has a long tube 53 screwed into the lower end thereof, in alinement with the bore 54, which latter communicates with the bore 49 of the tip or inner nozzle. With this arrangement only oxygen will be discharged from the tube 53, inasmuch as the acetylene cannot pass into the bore 54, the discharge of acetylene being prevented where the portion 51 tightly engages the conical lower end 47 of the tip or inner nozzle. Of course, as such time, the valve 9 can be closed, but to prevent accident, the tip portion 51 and the inner nozzle portion 47 are preferably so adjusted that they are very tightly in engagement with each other, in the manner explained.

What I claim as my invention is:—
1. In a torch equipment for different kinds of work, one kind of work involving the use of a nozzle structure adapted to discharge the oxygen and acetylene separately, thereby to adapt the torch for cutting purposes, and another kind of work involving the use of a second nozzle structure adapted to mix the oxygen and acetylene before being discharged, thereby to adapt the torch for welding purposes, the combination of a head having an externally threaded portion common to and whereon said nozzles are interchangeable to vary the character of the discharge, means for supplying oxygen to said head, means for supplying excess oxygen with the acetylene, means for cutting off the the excess oxygen when the welding nozzle is used, and means to control the normal supply of oxygen for the cutting or welding, whereby said nozzles form means in conjunction with said elements to change the character of the discharge and render the torch suitable for either purpose, said cutting nozzle having an inner member for discharging the oxygen into the atmosphere, said welding nozzle having an inner member for discharging the oxygen into the acetylene to form a mixture, said head having a threaded socket, and each inner member being threaded to screw into said socket.

2. In a torch equipment for different kinds of work, one kind of work involving the use of a nozzle structure adapted to discharge the oxygen and acetylene separately, thereby to adapt the torch for cutting purposes, and another kind of work involving the use of a second nozzle structure adapted to mix the oxygen and acetylene before being discharged, thereby to adapt the torch for welding purposes, the combination of a head having an externally threaded portion common to and whereon said nozzles are interchangeable to vary the character of the discharge, means for supplying oxygen to said head, means for supplying excess oxygen with the acetylene, means for cutting off the excess oxygen when the welding nozzle is used, and means to control the normal supply of oxygen for the cutting or welding, whereby said nozzles form means in conjunction with said elements to change the character of the discharge and render the torch suitable for either purpose, said head having a threaded lower portion, and a threaded socket in the head above said lower portion, each nozzle having an outer member to screw onto said lower portion of the head, and each nozzle having an inner member to screw into said socket.

3. In a torch, a head having a threaded socket therein, an oxygen passage leading to said socket, a chamber in the lower portion of said head, an acetylene passage leading to said chamber, a member formed with a longitudinal bore and having its upper end screwed into said socket, a nozzle body screwed onto the lower portion of said head and formed inside with an extension of said chamber around said member and having a restricted bore and a shoulder around the upper end of said bore, the lower end of said member extending through said restricted bore with clearance for the passage of the acetylene downwardly through said bore, and a nozzle tip screw-connected with said nozzle body and provided with a bore leading from the lower end of said member, there being a mixing space formed between the lower end of said member and the upper end of said nozzle tip.

4. A structure as specified in claim 3, the lower end of said member being conical, the upper end of the nozzle tip being recessed, and said member being adjustable up and down in said socket.

5. A structure as specified in claim 3, said member having an upper screw threaded portion (43), an upper cylindric portion (44), a polygonal portion (45), a lower cylindric portion (46), and a conical lower end (47), substantially as shown and described.

6. A structure as specified in claim 3, and means for converting said torch for a different purpose, comprising a substitute for said nozzle tip, adapted to be used interchangeably therewith, comprising a long tube having an enlargement at the upper end thereof to screw into said nozzle body, said enlargement being formed to tightly engage the lower end of said member, thereby to prevent acetylene from passing into said tube, and whereby only oxygen will be discharged, said tip and its said substitute cooperating to change the character of the discharge and thereby render the torch suitable for one purpose or the other.

7. A structure as specified in claim 3, and means for converting said torch for a different purpose, comprising a substitute for said nozzle tip, adapted to be used interchangeably therewith, comprising a long tube having an enlargement at its upper end to screw into said nozzle body, and means on the torch to shut off the supply of acetylene, so that only oxygen will be discharged from said tube, said tip and its said substitute cooperating to change the character of the discharge and thereby render the torch suitable for one purpose or the other.

JOHN J. STROBOT.